(12) United States Patent
McMullen et al.

(10) Patent No.: US 12,194,868 B2
(45) Date of Patent: Jan. 14, 2025

(54) VEHICLE WITH BEARING-MOUNTED PANTOGRAPH SUPPORT STRUCTURE

(71) Applicant: Komatsu America Corp., Chicago, IL (US)

(72) Inventors: James McMullen, Washington, IL (US); Peter J. Hinshaw, Dunlap, IL (US); Clint E. Rogers, Armington, IL (US); Bradley Roper, Dunlap, IL (US); Jeffrey A. Seiwell, Dunlap, IL (US); Joseph S. Peschong, East Peoria, IL (US)

(73) Assignee: Komatsu America Corp., Chicago, IL (US)

( * ) Notice: Subject to any disclaimer, the term of this patent is extended or adjusted under 35 U.S.C. 154(b) by 0 days.

(21) Appl. No.: 18/404,537

(22) Filed: Jan. 4, 2024

(65) Prior Publication Data

US 2024/0227569 A1    Jul. 11, 2024

Related U.S. Application Data

(60) Provisional application No. 63/437,402, filed on Jan. 6, 2023.

(51) Int. Cl.
*B60L 5/00* (2006.01)
*B60L 5/24* (2006.01)
(Continued)

(52) U.S. Cl.
CPC .............. *B60L 5/00* (2013.01); *B60M 1/12* (2013.01); *B60M 7/00* (2013.01)

(58) Field of Classification Search
CPC ... B60L 5/00; B60L 5/24; B60M 1/12; B60M 7/00
See application file for complete search history.

(56) References Cited

U.S. PATENT DOCUMENTS 3,529,103 A * 9/1970 Wortman .................. B60L 5/14
  191/85
3,806,158 A   4/1974 Casey
(Continued)

FOREIGN PATENT DOCUMENTS

CN    216268706 U    4/2022
JP    2015199368 A   11/2015
WO    2015075773 A1   5/2015

OTHER PUBLICATIONS

International Search Report and Written Opinion of the ISA issued in PCT/US2024/010434, mailed Apr. 24, 2024; ISA/US.

*Primary Examiner* — Bryan A Evans
(74) *Attorney, Agent, or Firm* — Harness, Dickey & Pierce, P.L.C.

(57) ABSTRACT

A vehicle may include a chassis, a motor, a pantograph, and a pantograph support structure. The pantograph may engage overhead wires and transmit electrical current to the motor. The pantograph support structure may include first and second leg frames, a lateral frame, and first and second bearing mount assemblies. The leg frames may include lower ends attached to the chassis. The lateral frame may be supported by the leg frames and disposed at upper ends of the leg frames. The lateral frame may support the pantograph. The first bearing mount assembly may be attached to the lower end of the first leg frame and may connect the first leg frame to the chassis. The second bearing mount assembly may be attached to the lower end of the second leg frame and may connect the second leg frame to the chassis.

20 Claims, 11 Drawing Sheets

(51) Int. Cl.
*B60M 1/12* (2006.01)
*B60M 7/00* (2006.01)

(56) References Cited

U.S. PATENT DOCUMENTS

| | | | |
|---|---|---|---|
| 8,944,227 | B2 | 2/2015 | Doddakula et al. |
| 9,315,107 | B2 * | 4/2016 | Tojima .................... B60L 50/11 |
| 9,550,424 | B2 * | 1/2017 | Goldwin .................... B60L 5/06 |
| 10,598,219 | B2 | 3/2020 | Voisine et al. |
| 2013/0105264 | A1 | 5/2013 | Ruth et al. |
| 2013/0264163 | A1 * | 10/2013 | Mishra .................... E21F 17/06 |
| | | | 29/525.01 |
| 2014/0027229 | A1 | 1/2014 | Tojima et al. |
| 2015/0136555 | A1 | 5/2015 | Kanazawa et al. |
| 2016/0152142 | A1 | 6/2016 | Goldwin et al. |

\* cited by examiner

VEHICLE WITH BEARING-MOUNTED PANTOGRAPH SUPPORT STRUCTURE

CROSS-REFERENCE TO RELATED APPLICATIONS

This application claims the benefit of U.S. Provisional Application No. 63/437,402, filed on Jan. 6, 2023. The entire disclosure of the above application is incorporated herein by reference.

FIELD

The present disclosure relates to a vehicle having a bearing-mounted pantograph support structure.

BACKGROUND

This section provides background information related to the present disclosure and is not necessarily prior art.

Heavy-duty vehicles such as off-highway mining vehicles may include one or more electric motors that are powered by overhead wires (e.g., trolley wires). Such vehicles may include one or more pantographs that can selectively engage the overhead wires to electrically connect the vehicle's motor(s) with the overhead wires. The one or more pantographs can be mounted on a support structure attached to the vehicle. Traditionally, such pantograph support structures are heavy, costly to manufacture and assemble, and are subjected to high stresses. The present disclosure provides a vehicle with a pantograph support structure that reduces stresses while also reducing weight, cost, and complexity.

SUMMARY

This section provides a general summary of the disclosure and is not a comprehensive disclosure of its full scope or all of its features.

The present disclosure provides a vehicle (e.g., a heavy-duty vehicle) that may include a chassis, a drive system, a pantograph, and a pantograph support structure. The drive system may be supported by the chassis and may include an electrically powered motor configured to propel (and/or retard) the vehicle. The pantograph may be configured to engage overhead electrical wires disposed above the vehicle and to transmit electrical current from the overhead electrical wires to the motor. The pantograph support structure may be mounted to the chassis and configured to support the pantograph. The pantograph support structure may include a first leg frame, a second leg frame, a lateral frame, a first bearing mount assembly, and a second bearing mount assembly. The first leg frame may include a lower end attached to the chassis. The second leg frame may have a lower end attached to the chassis. The lateral frame may be supported by the first and second leg frames and disposed at upper ends of the first and second leg frames. The lateral frame may support the pantograph. The first bearing mount assembly may be attached to the lower end of the first leg frame and may connect the first leg frame to the chassis. The first bearing mount assembly includes a first bearing assembly. The second bearing mount assembly may be attached to the lower end of the second leg frame and may connect the second leg frame to the chassis. The second bearing mount assembly includes a second bearing assembly.

In some configurations of the vehicle of the above paragraph, the second leg frame extends vertically upward from a front beam at front end of the vehicle.

In some configurations of the vehicle of either of the above paragraphs, the first leg frame is disposed at a non-perpendicular angle relative to the second leg frame and extends rearward from the upper end of the second leg frame.

In some configurations of the vehicle of any one or more of the above paragraphs, the lateral frame is centered over the second leg frame.

In some configurations of the vehicle of any one or more of the above paragraphs, the first and second bearing assemblies are spherical bearing assemblies, and each include an outer ring and an inner ring that is movable relative to the outer ring.

In some configurations of the vehicle of any one or more of the above paragraphs, the outer ring includes an inner diametrical surface having a spherical shape, and the inner ring includes an outer diametrical surface having a spherical shape. The outer diametrical surface of the inner ring is nested within and in movable contact with the inner diametrical surface of the outer ring.

In some configurations of the vehicle of any one or more of the above paragraphs, the pantograph includes links that are movable relative to the pantograph support structure between a stowed position in which the pantograph is spaced apart from the overhead electrical wires and a deployed position in which the pantograph is in contact with the overhead electrical wires.

In some configurations of the vehicle of any one or more of the above paragraphs, the pantograph is movable between the stowed and deployed positions without corresponding movement of the pantograph support structure.

In some configurations of the vehicle of any one or more of the above paragraphs, the pantograph support structure includes a brace that is fixedly attached to the first leg frame and the second leg frame.

In some configurations of the vehicle of any one or more of the above paragraphs, the pantograph support structure is attached to the chassis only at the first and second leg frames.

In some configurations of the vehicle of any one or more of the above paragraphs, the first leg frame includes a first support beam and a second support beam, the second leg frame includes a first support beam and a second support beam, the first support beam of the first leg frame is connected to the chassis by the first bearing mount assembly, the second support beam of the first leg frame is connected to the chassis by another first bearing mount assembly, the first support beam of the second leg frame is connected to the chassis by the second bearing mount assembly, and the second support beam of the second leg frame is connected to the chassis by another second bearing mount assembly.

In some configurations of the vehicle of any one or more of the above paragraphs, the pantograph support structure is attached to the chassis only at the first and second bearing mount assemblies that are attached to the first and second support beams of the first and second leg frames.

In some configurations of the vehicle of any one or more of the above paragraphs, the first leg frame includes a plurality of braces that are fixedly attached to and extend between the first and second support beams of the first leg frame, the second leg frame includes a plurality of braces that are fixedly attached to and extend between the first and second support beams of the second leg frame, the pantograph support structure includes another brace that is fixedly attached to the first support beam of the first leg frame and the first support beam of the second leg frame, and the pantograph support structure includes another brace that is fixedly attached to the second support beam of the first leg frame and the second support beam of the second leg frame.

In some configurations of the vehicle of any one or more of the above paragraphs, chassis includes a ladder disposed between second leg frame and a radiator.

In some configurations of the vehicle of any one or more of the above paragraphs, the ladder is spaced apart from the pantograph support structure.

In some configurations of the vehicle of any one or more of the above paragraphs, the pantograph is centered over a front bumper of the vehicle.

The present disclose also provides a vehicle that may include a chassis, an electric motor, a pantograph support structure, and a pantograph. The pantograph support structure may be mounted to the chassis. The pantograph may be mounted on the pantograph support structure and may be in electrical communication with the electric motor. The pantograph may be movable relative to the pantograph support structure between a stowed position in which the pantograph is spaced apart from overhead electrical wires and a deployed position in which the pantograph is in contact with the overhead electrical wires. The pantograph may be movable between the stowed and deployed positions without corresponding movement of the pantograph support structure. The pantograph support structure may include a first leg frame, a second leg frame, a first bearing mount assembly, and a second bearing mount assembly. The first leg frame may have a lower end attached to the chassis. The second leg frame may have a lower end attached to the chassis. The first bearing mount assembly may be attached to the lower end of the first leg frame and may connect the first leg frame to the chassis. The first bearing mount assembly includes a first bearing assembly. The second bearing mount assembly may be attached to the lower end of the second leg frame and may connect the second leg frame to the chassis. The second bearing mount assembly includes a second bearing assembly.

In some configurations of the vehicle of the above paragraph, the second leg frame extends vertically upward from a front beam at front end of the vehicle.

In some configurations of the vehicle of either of the above paragraphs, the first leg frame is disposed at a non-perpendicular angle relative to the second leg frame and extends rearward from an upper end of the second leg frame.

In some configurations of the vehicle of any one or more of the above paragraphs, the first and second bearing assemblies each include an outer ring and an inner ring that is movable relative to the outer ring.

In some configurations of the vehicle of any one or more of the above paragraphs, the outer ring includes an inner diametrical surface having a spherical shape, and the inner ring includes an outer diametrical surface having a spherical shape.

In some configurations of the vehicle of any one or more of the above paragraphs, the outer diametrical surface of the inner ring is nested within and in movable contact with the inner diametrical surface of the outer ring.

In some configurations of the vehicle of any one or more of the above paragraphs, the pantograph support structure includes a lateral frame attached to upper ends of the first and second leg frames.

In some configurations of the vehicle of any one or more of the above paragraphs, the upper ends of the first and second leg frames are fixedly attached to the lateral fame via a rigid bracket.

In some configurations of the vehicle of any one or more of the above paragraphs, the first leg frame includes a first support beam and a second support beam.

In some configurations of the vehicle of any one or more of the above paragraphs, the second leg frame includes a first support beam and a second support beam.

In some configurations of the vehicle of any one or more of the above paragraphs, the first support beam of the first leg frame is connected to the chassis by the first bearing mount assembly.

In some configurations of the vehicle of any one or more of the above paragraphs, the second support beam of the first leg frame is connected to the chassis by another first bearing mount assembly.

In some configurations of the vehicle of any one or more of the above paragraphs, the first support beam of the second leg frame is connected to the chassis by the second bearing mount assembly.

In some configurations of the vehicle of any one or more of the above paragraphs, the second support beam of the second leg frame is connected to the chassis by another second bearing mount assembly.

In some configurations of the vehicle of any one or more of the above paragraphs, the pantograph support structure is attached to the chassis only at the first and second bearing mount assemblies that are attached to the first and second support beams of the first and second leg frames.

In some configurations of the vehicle of any one or more of the above paragraphs, the first leg frame includes a plurality of braces that are fixedly attached to and extend between the first and second support beams of the first leg frame.

In some configurations of the vehicle of any one or more of the above paragraphs, the second leg frame includes a plurality of braces that are fixedly attached to and extend between the first and second support beams of the second leg frame.

In some configurations of the vehicle of any one or more of the above paragraphs, the pantograph support structure includes another brace that is fixedly attached to the first support beam of the first leg frame and the first support beam of the second leg frame.

In some configurations of the vehicle of any one or more of the above paragraphs, the pantograph support structure includes another brace that is fixedly attached to the second support beam of the first leg frame and the second support beam of the second leg frame.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations and are not intended to limit the scope of the present disclosure.

Corresponding reference numerals indicate corresponding parts throughout the several views of the drawings.

DETAILED DESCRIPTION

Figure 1:
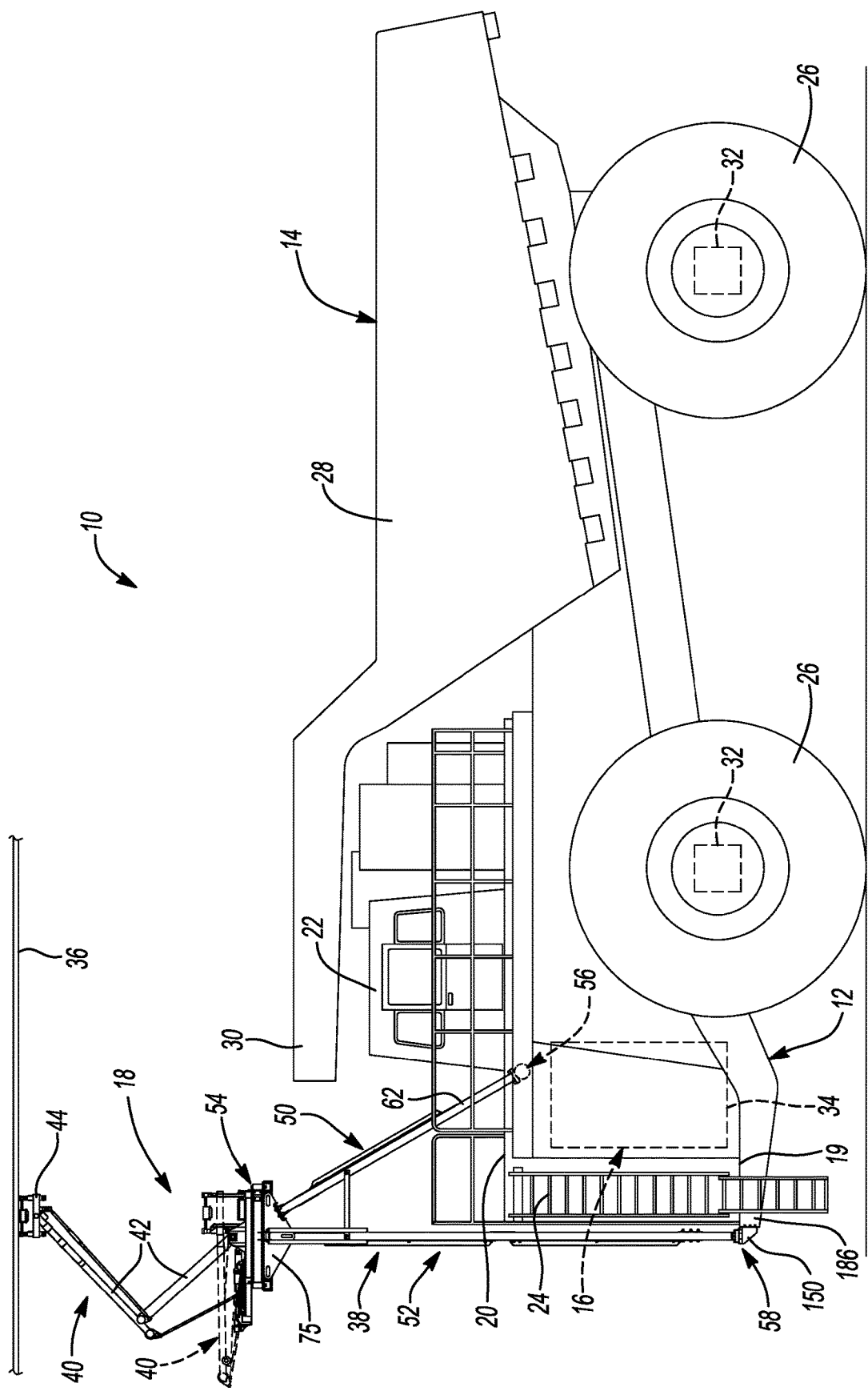
FIG. 1 is a side view of a vehicle having a pantograph support structure according to the principles of the present disclosure.

Example embodiments will now be described more fully with reference to the accompanying drawings.

Example embodiments are provided so that this disclosure will be thorough and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

Figure 2:
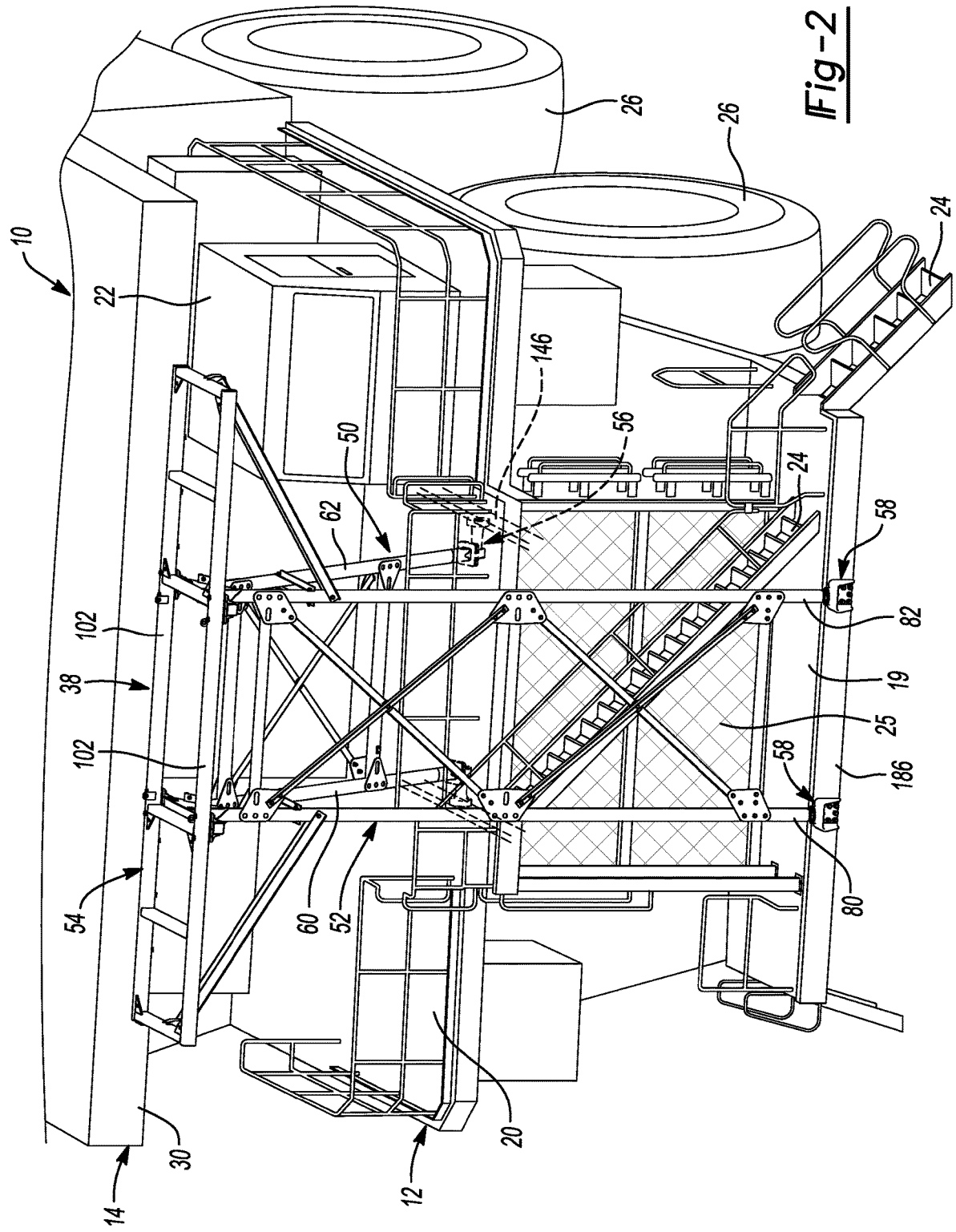
FIG. 2 is a partial perspective view of the vehicle of FIG. 1.
Figure 3:
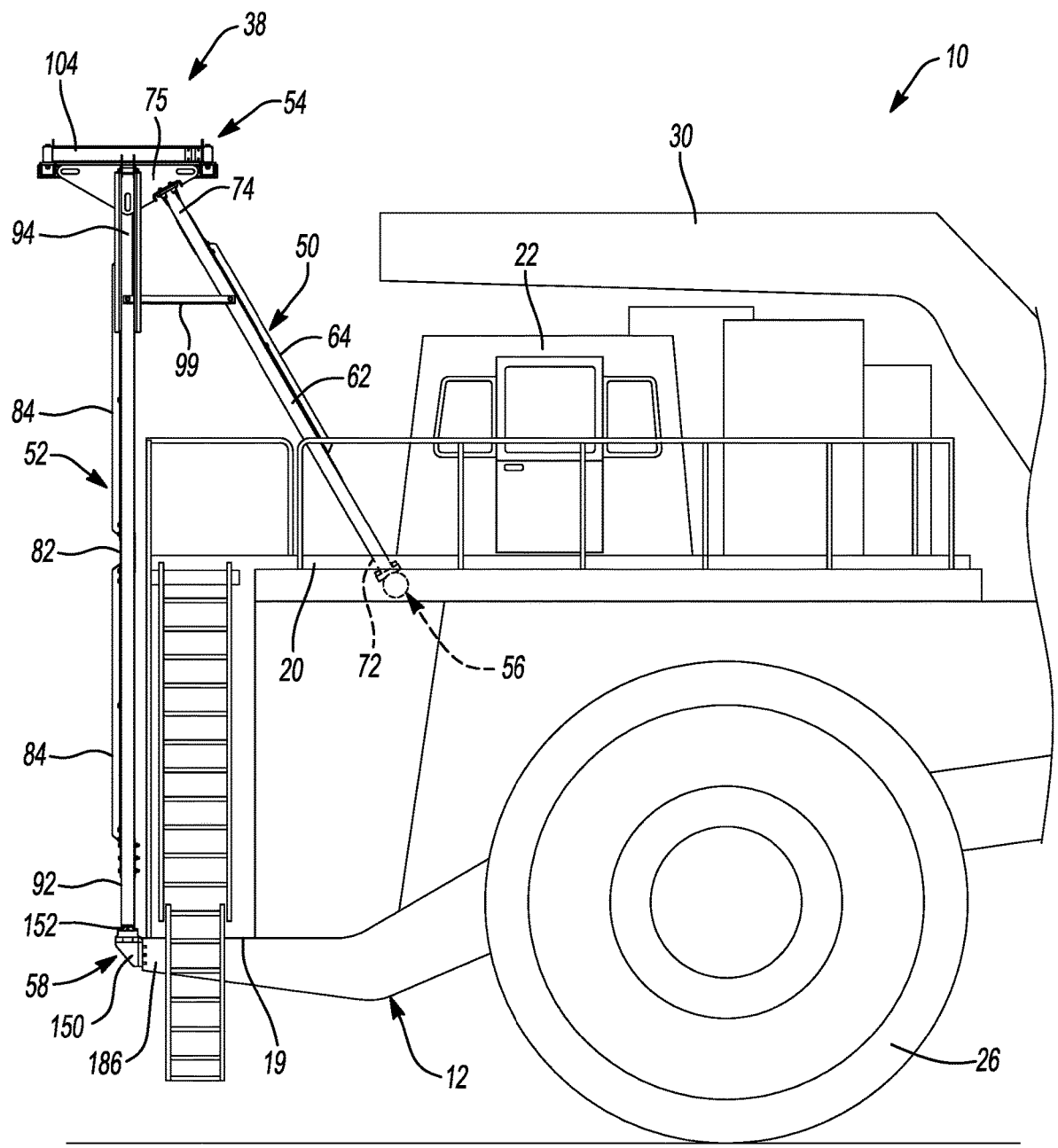
FIG. 3 is a partial side view of the vehicle of FIG. 1.

With reference to FIGS. 1-3, a vehicle 10 is provided. The vehicle 10 shown in the figures is an off-highway mining truck. However, it will be appreciated that the principles of the present disclosure are applicable to other types of heavy-duty vehicles including wheeled, tracked or rail vehicles, for example, that are configured for use in the mining, construction, or transportation industries, for example.

The vehicle 10 may include a vehicle frame or chassis 12, a dump body 14, a drive system 16, and a pantograph assembly 18. The chassis 12 may include a lower deck 19, an upper deck 20, and an operator cab 22 disposed on the upper deck 20. One or more ladders or staircases 24 may be mounted to the decks 19, 20. A radiator 25 (FIG. 2) may be disposed at a front end of the chassis 12 and may extend between the decks 19, 20. The chassis 12 supports the dump body 14, a plurality of wheels 26, the drive system 16, and the pantograph assembly 18.

The dump body 14 may include a bucket 28 and a canopy 30 that may be fixed to the bucket 28. The canopy 30 extends forward from the bucket 28 and may extend over the operator cab 22 and a portion of the upper deck 20. The dump body 14 may be rotatable relative to the chassis 12 about a pivot disposed at or near a rear end of the chassis 12. A hydraulic actuation system can rotate the dump body 14 relative to the chassis 12 between a load position (shown in FIG. 1) and an unload (or dump) position.

As shown in FIG. 1, the drive system 16 may include one or more electric motors 32, each of which may be configured to drive and/or retard one or more of the wheels 26. In some configurations, the drive system 16 may include a combustion engine 34. The combustion engine 34 may power a generator (not shown) that produces electrical power that can be supplied to the motors 32. The drive system 16 may be operable in a first mode in which the combustion engine 34 and generator operate to supply electrical power to the motors 32 and in a second mode in which the combustion engine 34 and generator can be shut down and the pantograph assembly 18 may transmit electrical power from overhead wires 36 to the electrical motors 32 (e.g., via internal wiring and electrical control and/or transmission modules).

The pantograph assembly 18 may include a pantograph support structure 38 and one or more pantographs 40 that are mounted on and supported by the pantograph support structure 38. The pantographs 40 may be movable relative to the pantograph support structure 38 and the chassis 12 between a lowered or stowed position (shown in dashed lines in FIG. 1) and a raised or deployed position (shown in solid lines in FIG. 1). In the stowed position, the pantographs 40 are electrically disconnected from the overhead wires 36. In the deployed position, the pantographs 40 are electrically connected to the overhead wires 36 such that electrical current flowing through the overhead wires 36 can be transmitted to the electrical motors 32 via the pantographs 40. The pantographs 40 may include movable links 42 that move (e.g., rotate) relative to the pantograph support structure 38 between the stowed and deployed positions. The links 42 may support a conductor assembly 44 that can selectively contact the overhead wires 36. An actuator (e.g., a motor or hydraulic system) may drive the links 42 between the stowed and deployed positions.

The pantograph support structure 38 may include a first leg frame (or back leg frame) 50, a second leg frame (or front leg frame) 52, and a lateral frame 54. The first leg frame 50 may be attached to the chassis 12 (e.g., to the upper deck 20) by one or more first bearing mount assemblies 56. The second leg frame 52 may be attached to the chassis 12 (e.g., to the lower deck 19) by one or more second bearing mount assemblies 58. The first and second leg frames 50, 52 may be rigidly attached to the lateral frame 54. The first leg frame 50 may extend at a non-perpendicular angle relative to the second leg frame 52. For example, the second leg frame 52 may extend substantially vertically from the lower deck 19 and the first leg frame 50 may extend from the upper deck 20 at an angle relative to the second leg frame 52, thereby forming a "kickstand" configuration. The lateral frame 54 may be attached to the tops of the first and second leg frames 50, 52. The pantographs 40 may be mounted to the lateral frame 54 and are movable relative to the leg frames 50, 52 and the lateral frame 54 between the stowed and deployed positions.

The first leg frame 50 may include a first support beam or leg 60 and a second support beam or leg 62. One or more support braces (e.g., one or more diagonally extending support braces 64 and/or one or more horizontally extending support braces 65) may extend between the first and second support beams 60, 62. The support braces 64, 65 restrict or prevent relative movement between the first and second support beams 60, 62. The support braces 64, 65 may be rigidly (or fixedly) attached to the first and second support beams 60, 62 (e.g., via rigid brackets 66 attached to the braces 64, 65 and support beams 60, 62 by threaded fasteners or rivets, for example). In the particular example shown in the figures, the first leg frame 50 includes two horizontally extending support braces 65 (e.g., that are perpendicular to the support beams 60, 62) and two diagonally extending support braces 64 (e.g., that are at non-perpendicular angles relative to the support beams 60, 62). It will be appreciated that there could be any other number (i.e., zero or more) of the support braces (including any number of horizontally extending support braces 65 and any number of diagonally extending support braces 64).

A first end 68 of the first support beam 60 may be attached to the upper deck 20 by one of the first bearing mount assemblies 56. A second end 70 of the first support beam 60 may be rigidly (or fixedly) attached to the lateral frame 54 (e.g., the second end 70 is attached to a rigid bracket 71 by fasteners and the rigid bracket 71 is attached to the lateral frame 54 by fasteners). A first end 72 of the second support beam 62 may be attached to the upper deck 20 by another one of the first bearing mount assemblies 56. A second end 74 of the second support beam 62 may be rigidly (or fixedly) attached to the lateral frame 54 (e.g., the second end 74 is attached to a rigid bracket 75 by fasteners and the rigid bracket 75 is attached to the lateral frame 54 by fasteners).

The second leg frame 52 may include a first support beam or leg 80 and a second support beam or leg 82. One or more support braces (e.g., one or more diagonally extending support braces 84 and/or one or more horizontally extending support braces 85) may extend between the first and second support beams 80, 82. The support braces 84, 85 restrict or prevent relative movement between the first and second support beams 80, 82. The support braces 84, 85 may be rigidly (or fixedly) attached to the first and second support beams 80, 82 (e.g., via rigid brackets 86 attached to the braces 84, 85 and support beams 80, 82 by threaded fasteners or rivets, for example). In the particular example shown in the figures, the second leg frame 52 includes three horizontally extending support braces 85 (e.g., that are perpendicular to the support beams 80, 82) and four diagonally extending support braces 84 (e.g., that are at non-perpendicular angles relative to the support beams 80, 82). It will be appreciated that there could be any other number (i.e., zero or more) of the support braces 84, 85 (including any number of horizontally extending support braces 85 and any number of diagonally extending support braces 84).

A first end 88 of the first support beam 80 may be attached to the lower deck 19 by one of the second bearing mount assemblies 58. A second end 90 of the first support beam 80 may be rigidly (or fixedly) attached to the lateral frame 54 (e.g., the second end 90 is attached to the rigid bracket 71 by fasteners and the rigid bracket 71 is attached to the lateral frame 54 by fasteners). A first end 92 of the second support beam 82 may be attached to the lower deck 19 by another one of the second bearing mount assemblies 58. A second end 94 of the second support beam 82 may be rigidly (or fixedly) attached to the lateral frame 54 (e.g., the second end 94 is attached to the rigid bracket 75 by fasteners and the rigid bracket 75 is attached to the lateral frame 54 by fasteners). The rigid brackets 71, 75 restrict or prevent relative movement between the first leg frame 50 and the lateral frame 54, restrict or prevent relative movement between the second leg frame 52 and the lateral frame 54, and restrict or prevent relative movement between the first leg frame 50 and the second leg frame 52.

Figure 4:
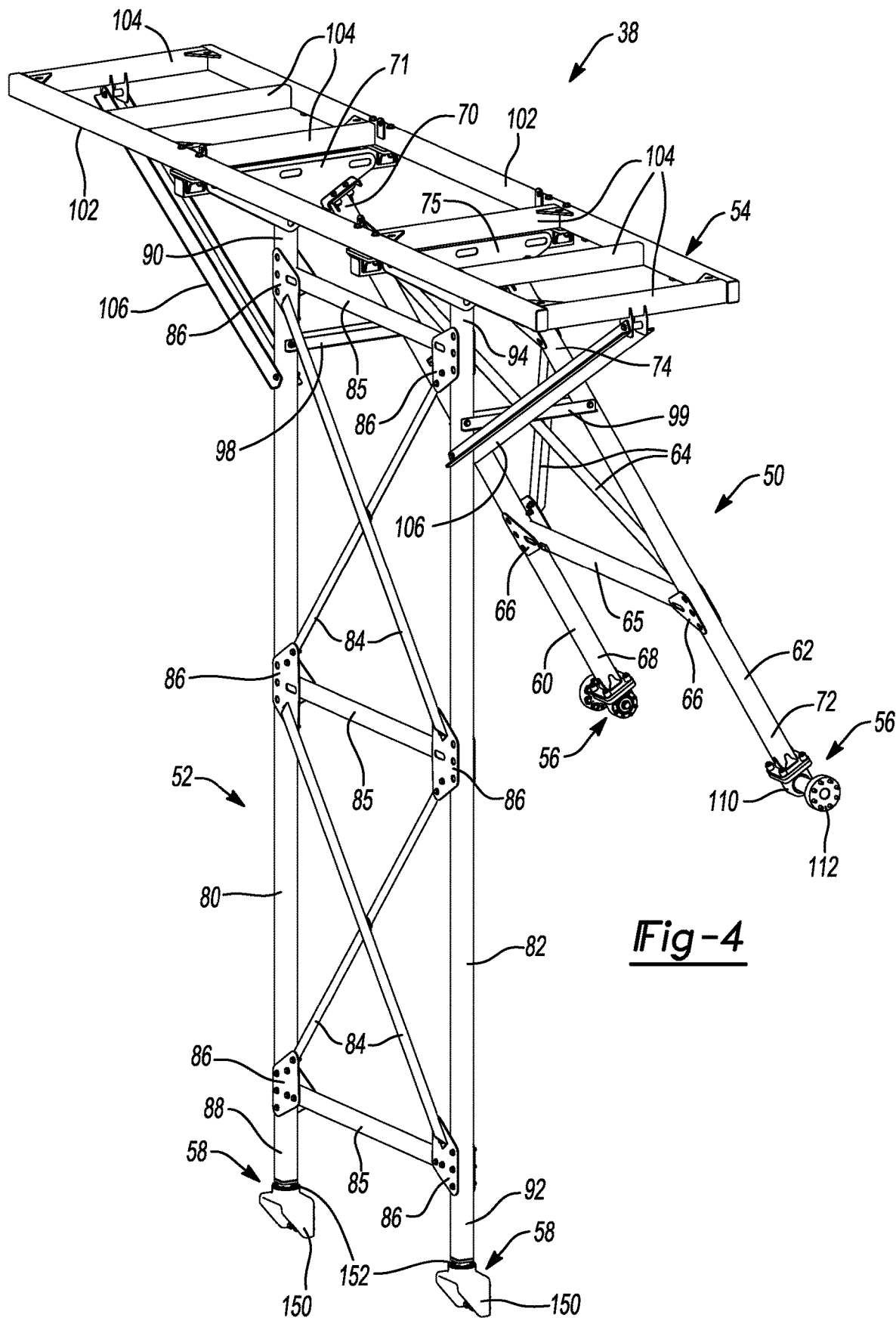
FIG. 4 is a perspective view of the support structure.
Figure 5:
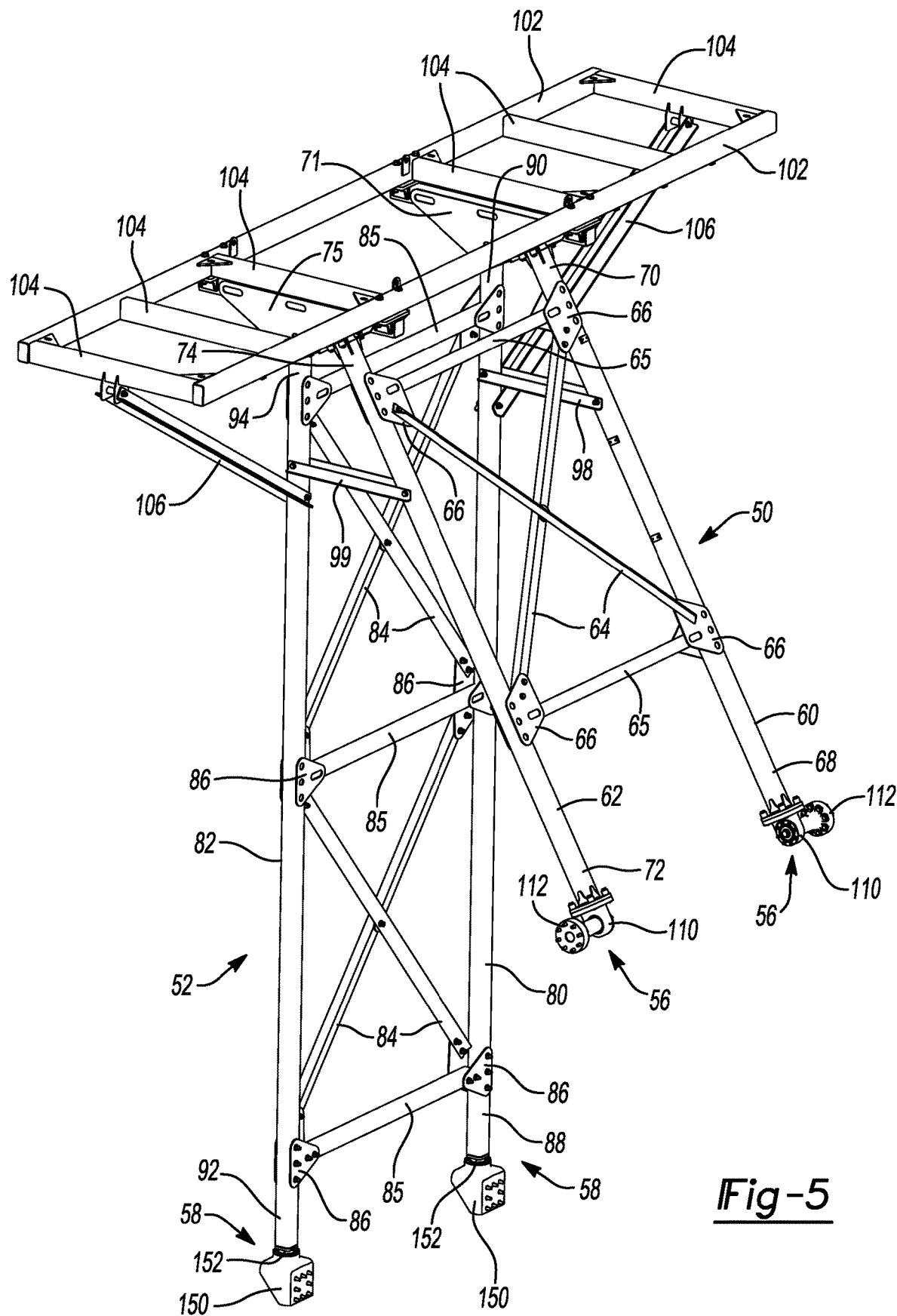
FIG. 5 is another perspective view of the support structure.

As shown in FIGS. 4 and 5, connecting braces 98, 99 may be attached to the first and second leg frames 50, 52. For example, the connecting brace 98 may be attached (e.g., by fasteners) to the first support beam 60 of the first leg frame 50 and the first support beam 80 of the second leg frame 52, and the connecting brace 99 may be attached (e.g., by fasteners) to the second support beam 62 of the first leg frame 50 and the second support beam 82 of the second leg frame 52. The connecting braces 98, 99 further restrict or prevent relative movement between the first leg frame 50 and the second leg frame 52.

The lateral frame 54 may include a plurality of support beams 102 and a plurality of cross beams 104 extending between the support beams 102. Each of the cross beams 104 may be rigidly (fixedly) attached to the lateral frame 54 (e.g., to the support beams 102 and/or selected ones of the cross beams 104) by fasteners and/or brackets, for example. Braces 106 may be attached to the second leg frame 52 and the lateral frame 54. For example, one or more of the braces 106 may be attached to the first support beam 80 and one of the cross beams 104 and another one or more of the braces 106 may be attached to the second support beam 82 and another of the cross beams 104. The braces 106 further restrict or prevent relative movement between the second leg frame 54 and the lateral frame 54. The pantographs 40 may be mounted to the support beams 102 and/or the cross beams 104.

Figure 6:
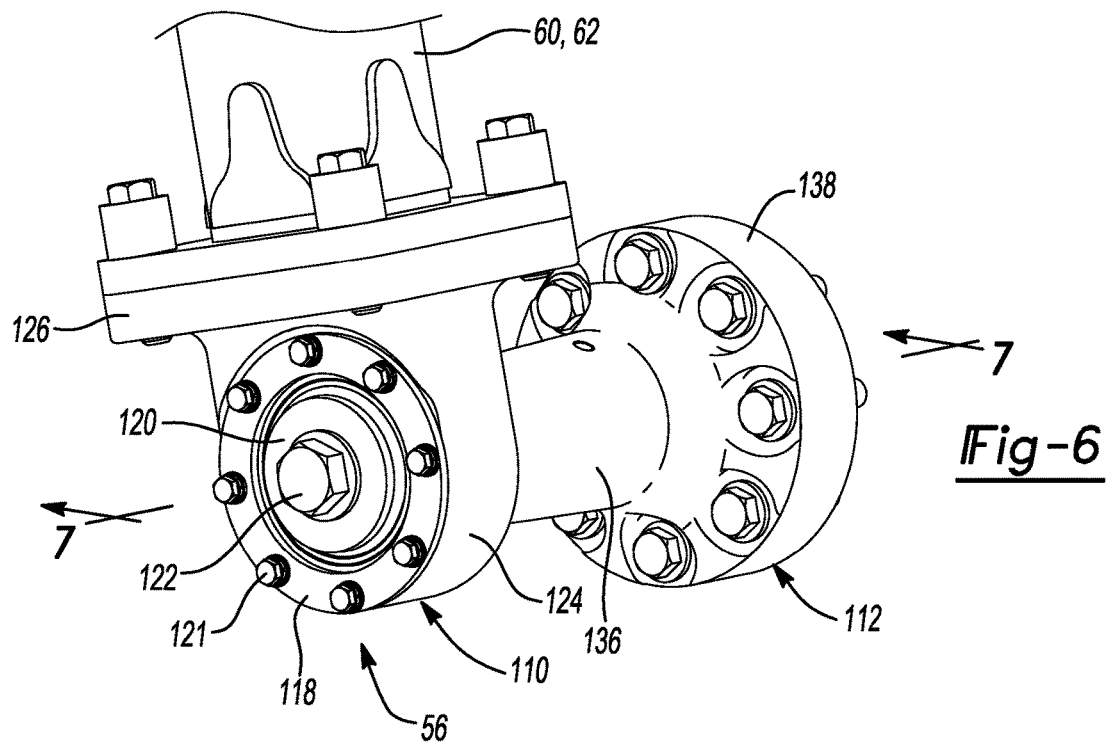
FIG. 6 is a perspective view of a bearing mount assembly of the support structure.
Figure 7:
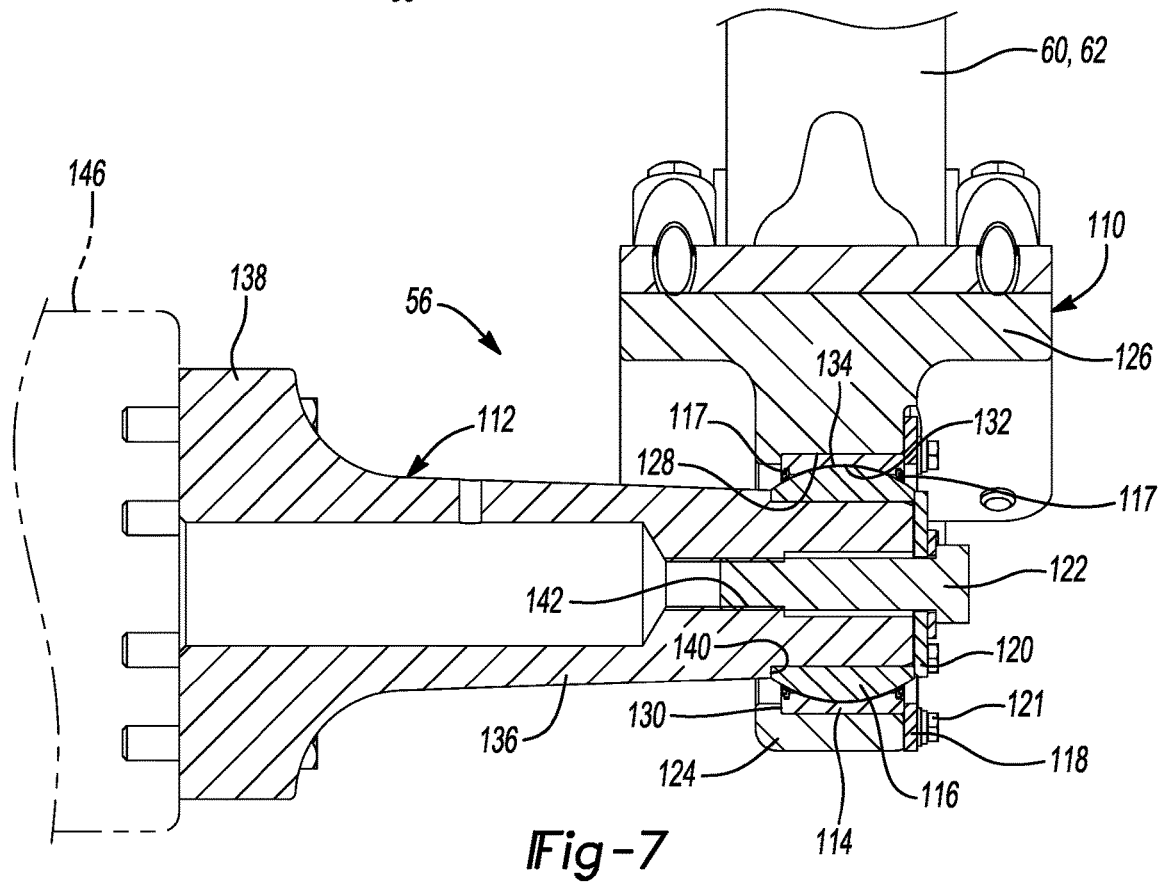
FIG. 7 is a cross-sectional view of the bearing mount assembly of FIG. 6.
Figure 8:
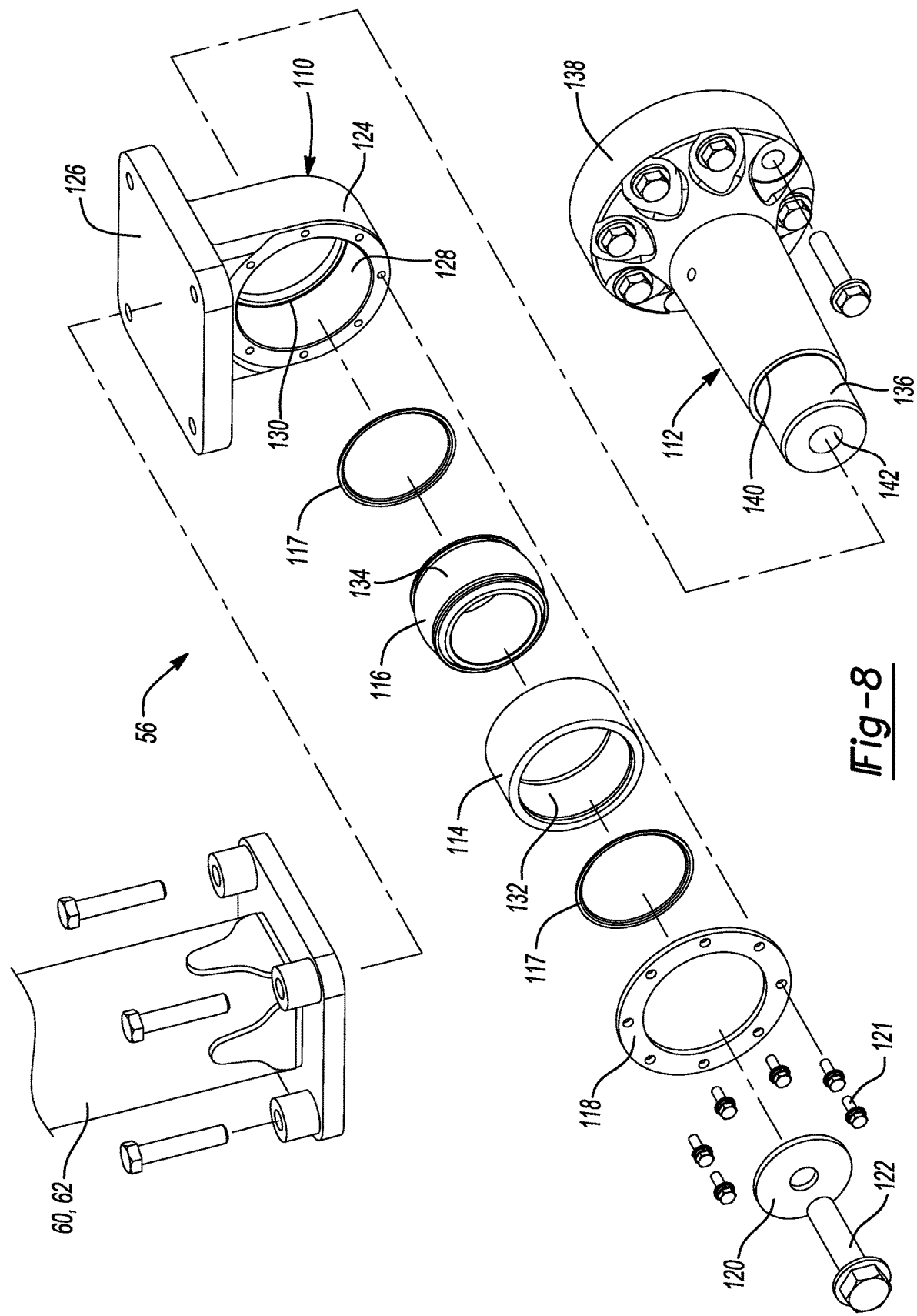
FIG. 8 is an exploded view of the bearing mount assembly of FIG. 6.

Referring now to FIGS. 6-8, each of the first bearing mount assemblies 56 may include a bearing housing 110, a bearing pin 112, an outer bearing ring 114, an inner bearing ring 116, seal rings 117, an outer retaining washer 118, an inner retaining washer 120, a plurality of outer fasteners 121, and an inner fastener 122. The outer and inner bearing rings 114, 116 may define a spherical bearing assembly that allows small amounts of relative movement between the bearing housing 110 and the bearing pin 112.

The bearing housing 110 may include a body 124 and a mounting flange 126 extending from the body 124. The body 124 may include an aperture 128 that receives the outer and inner bearing rings 114, 116 and the seal rings 117. The outer bearing ring 114 may be disposed between an annular ledge 130 of the bearing housing 110 and the outer retaining washer 118. The outer retaining washer 118 may be fixed to the body 124 of the bearing housing 110 via the outer fasteners 121. In this manner, the annular ledge 130 and the outer retaining washer 118 axially retain the outer bearing ring 114 within the aperture 128 of the bearing housing 110.

The outer bearing ring 114 includes an inner diametrical surface 132 that may have a spherical shape. The inner bearing ring 116 includes an outer diametrical surface 134 that may have a spherical shape that corresponds to the spherical shape of the inner diametrical surface 132 of the outer bearing ring 114. The inner bearing ring 116 may be received within the outer bearing ring 114 such that the outer diametrical surface 134 is in rotatable contact with the inner diametrical surface 132. The seal rings 117 may sealingly engage the outer bearing ring 114 and the inner bearing ring 116 to prevent contaminants from entering the bearing assembly.

The bearing pin 112 may include a generally cylindrical body 136 and a mounting flange 138 extending from an end of the body 136. Another end of the body 136 may be received in the inner bearing ring 116. The inner bearing ring 116 may be disposed between the inner retaining washer 120 and an annular ledge 140 of the body 136 of the bearing pin 112. The inner retaining washer 120 may be fixed to the body 136 of the bearing pin 112 via the inner fastener 122, which is threadably received in an aperture 142 of the body 136 of the bearing pin 112. In this manner, the annular ledge 140 and the inner retaining washer 120 axially retain the bearing pin 112 relative to the inner bearing ring 116.

Figure 12:
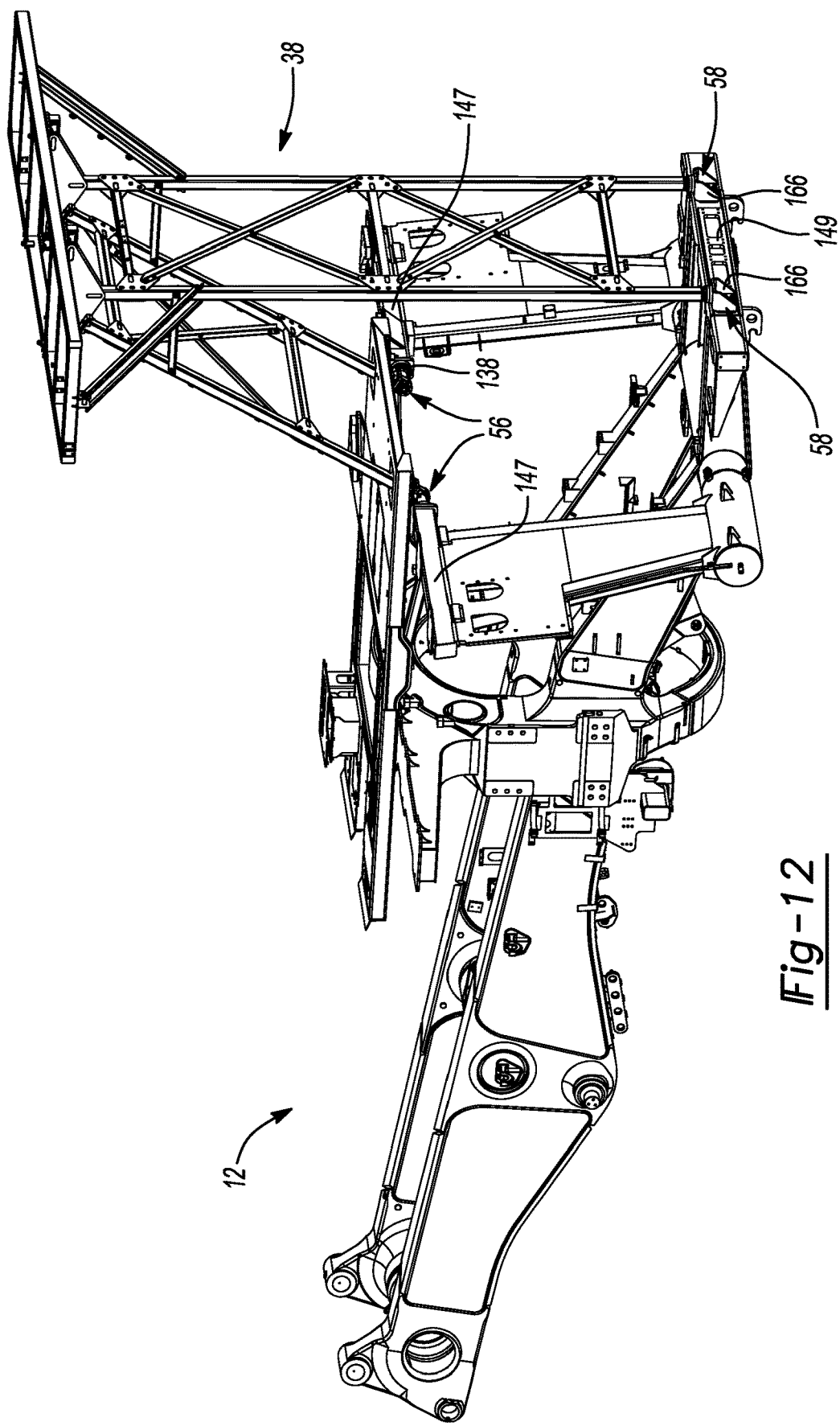
FIG. 12 is a perspective view of the pantograph support structure mounted to a chassis of the vehicle.
Figure 13:
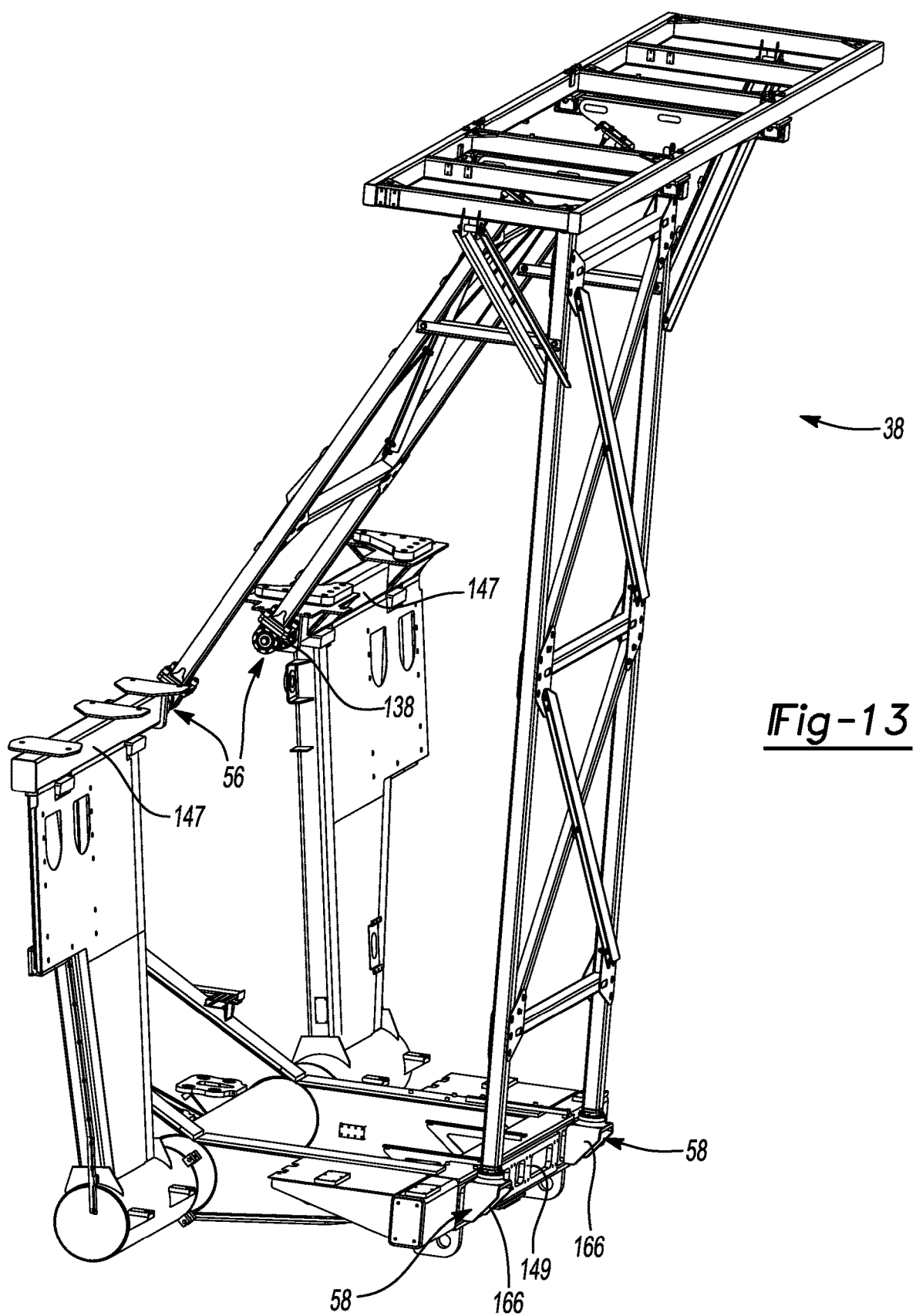
FIG. 13 is a partial perspective view of the pantograph support structure mounted to a chassis of the vehicle.

The mounting flange 126 of the bearing housing 110 may be fixedly attached (e.g., via fasteners) to the support beam 60, 62 of the first leg frame 50. The mounting flange 138 of the bearing pin 112 may be fixedly attached (e.g., via fasteners) to a surface 146 (e.g., a beam, rail, or other surface) of the upper deck 20 of the chassis 12, as shown in FIGS. 2 and 7. In some embodiments (as shown in FIGS. 12 and 13), the mounting flanges 138 of the first bearing mount assemblies 56 may be mounted to respective surfaces of beams or support members 147 of a frame that may be a part of or fixedly attached to the chassis 12. The support beams 60, 62 may extend through openings in the upper deck 20. It will be appreciated that the mounting flanges 138 of the first bearing mount assemblies 56 may be mounted to any fixed structure of the vehicle 10.

Figure 10:
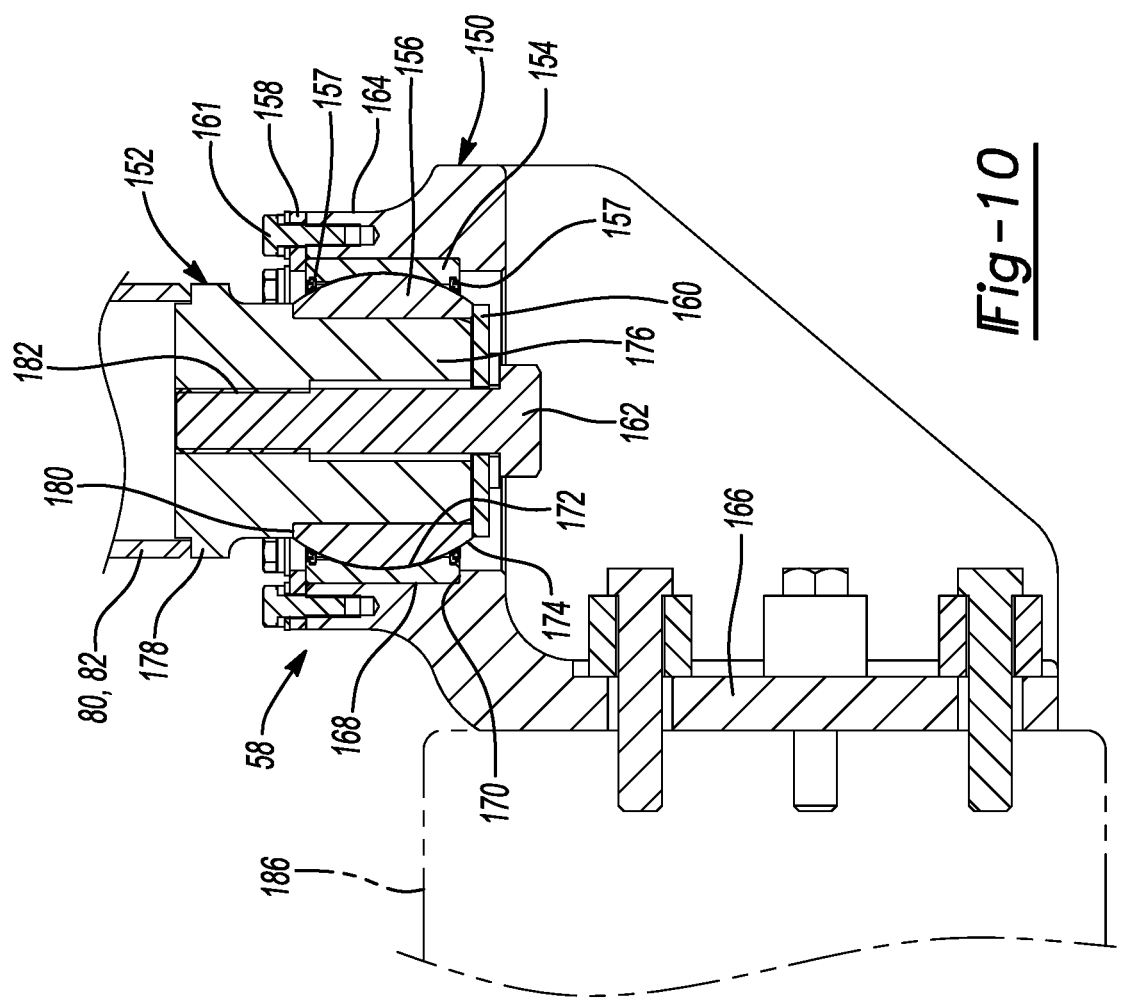
FIG. 10 is a cross-sectional view of the bearing mount assembly of FIG. 9.
Figure 9:
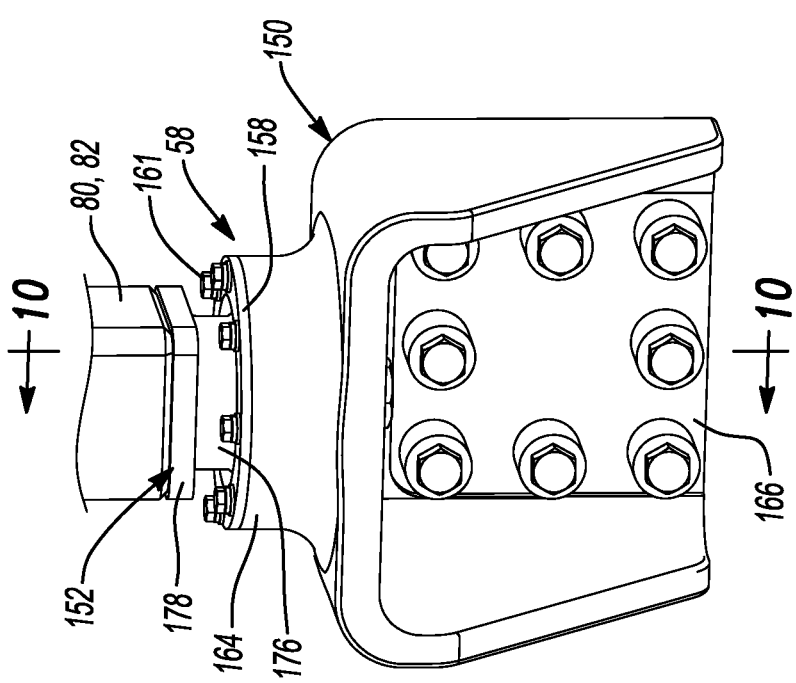
FIG. 9 is a perspective view of another bearing mount assembly of the support structure.
Figure 11:
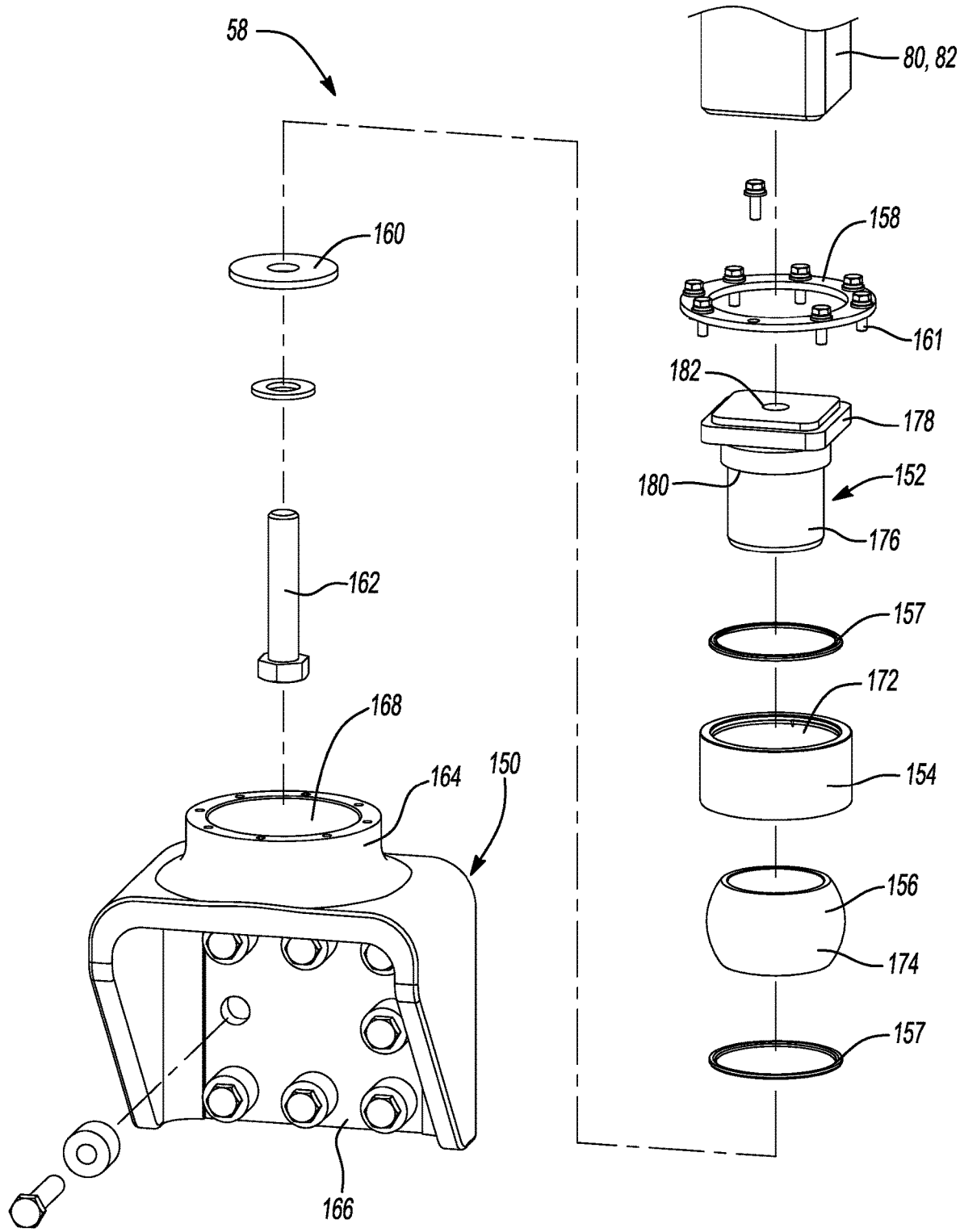
FIG. 11 is an exploded view of the bearing mount assembly of FIG. 9.

Referring now to FIGS. 9-11, each of the second bearing mount assemblies 58 may include a bearing housing 150, a bearing pin 152, an outer ring 154, an inner ring 156, seal rings 157, an outer retaining washer 158, an inner retaining washer 160, a plurality of outer fasteners 161, and an inner fastener 162.

The bearing housing 150 may include a body 164 and a mounting flange 166 extending from the body 164. The body 164 may include an aperture 168 that receives the outer and inner rings 154, 156 and the seal rings 157. The outer ring 154 may be disposed between an annular ledge 170 (FIG. 10) of the bearing housing 150 and the outer retaining washer 158. The outer retaining washer 158 may be fixed to the body 164 of the bearing housing 150 via the outer fasteners 161. In this manner, the annular ledge 170 and the outer retaining washer 158 axially retain the outer ring 154 within the aperture 168 of the bearing housing 150.

The outer ring 154 includes an inner diametrical surface 172 that may have a spherical shape. The inner ring 156 includes an outer diametrical surface 174 that may have a spherical shape that corresponds to the spherical shape of the inner diametrical surface 172 of the outer ring 154. The inner ring 156 may be received within the outer ring 154 such that the outer diametrical surface 174 is in rotatable contact with the inner diametrical surface 172. The seal rings 157 may sealingly engage the outer ring 154 and the inner ring 156 to prevent contaminants from entering the bearing assembly.

The bearing pin 152 may include a generally cylindrical body 176 and a mounting flange 178 extending from an end of the body 176. Another end of the body 176 may be received in the inner ring 156. The inner ring 156 may be disposed between the inner retaining washer 160 and an annular ledge 180 of the body 176 of the bearing pin 152. The inner retaining washer 160 may be fixed to the body 176 of the bearing pin 152 via the inner fastener 162, which is threadably received in an aperture 182 of the body 176 of the bearing pin 152. In this manner, the annular ledge 180 and the inner retaining washer 160 axially retain the bearing pin 152 relative to the inner ring 154.

The mounting flange 166 of the bearing housing 150 may be fixedly attached (e.g., via fasteners) to a surface (e.g., of a front beam or bumper 186, rail, or other structural member) of the lower deck 19, front bumper, or front end of the chassis 12, as shown in FIGS. 2 and 10. FIGS. 12 and 13 show the mounting flanges 166 of the second bearing mount assemblies 58 mounted to a surface of a beam or support member 149 that may be a part of or fixedly attached to the chassis 12 (i.e., at or near the front end of the chassis 12). It will be appreciated that the mounting flanges 166 of the second bearing mount assemblies 58 may be mounted to any fixed structure of the vehicle 10. The mounting flange 178 of the bearing pin 152 may be fixedly attached (e.g., via fasteners) to the support beam 80, 82 of the second leg frame 52.

The features of the pantograph support structure 38 described above and shown in the figures provide several benefits and advantages. For example, the kickstand configuration of the first and second leg frames 50, 52 (e.g., the first leg frame 50 extending from the chassis 12 at an angle relative to the second leg frame 52) minimizes movement of the pantograph support structure 38 when the vehicle 10 accelerates or decelerates and also minimizes stresses in the pantograph support structure 38. Furthermore, the second leg frame 52 extending vertically from the front end of the chassis 12 (e.g., from the front beam 186 of the lower deck 19) and the lateral frame 54 being centered over the second leg frame 52 (as shown in FIGS. 1 and 3) centers the mass of the pantograph assembly 18 over the front beam 186 and also positions the lateral frame 54 and pantographs 40 further forward relative to the canopy 30 of the dump body 14 (which could allow for the canopy 30 to be lengthened, e.g., so that the canopy 30 could be configured to extend over more of the upper deck 20). Positioning the lateral frame 54 and pantographs 40 over the front beam 186 also makes it easier for an operator in the operator cab 22 to see the pantographs 40 while operating the vehicle 10, which makes it easier for the operator to maintain alignment between the pantographs and the overhead wires 36.

Furthermore, positioning the lateral frame 54 and pantographs 40 over the front beam 186 also allows clearance for the ladder 24 to be positioned between the first and second leg frames 50, 52 and to extend diagonally in front of the radiator 25 between the lower and upper decks 19, 20 (this reduces customizations or modifications to the vehicle 10 that are needed to install the pantograph assembly 18 and eliminates any need to integrate the ladder 24 into the pantograph support structure 38).

Furthermore, the first and second leg frames 50, 52 being mounted to the chassis 12 via the bearing mount assemblies 56, 58 (which include the spherical bearing assemblies) allows for small amounts of movement of the support beams 60, 62, 80, 82 relative to the chassis 12 and relative to each other. Allowing this small amount of movement reduces stresses at and around the points at which the pantograph support structure 38 is attached to the vehicle 10 (and reduces stresses at other locations throughout the pantograph support structure 38). The use of the bearing mount assemblies 56, 58 to mount to the pantograph support structure 38 to the vehicle 10 results in less movement of the pantograph support structure 38 relative to the vehicle 10 than prior-art pantograph support structures that are mounted to a vehicle via dampers or isolators. The use of the bearing mount assemblies 56, 58 to mount to the pantograph support structure 38 to the vehicle 10 also allows for metal-to-metal connections (i.e., without dampers or isolators) between the support braces 64, 65, 84, 85 and the support beams 60, 62, 80, 82, between the brackets 71, 75, and between the lateral frame 54 and the brackets 71, 75.

Furthermore, the configuration of the pantograph support structure 38 may also increase the life of the pantograph support structure 38 while reducing the overall weight and number of components of the pantograph support structure 38 and reducing the amount of time needed to assemble and install the pantograph support structure 38 onto the vehicle 10. Furthermore, attaching the support braces 64, 65, 84, 85 to the support beams 60, 62, 80, 82, respectively, via threaded fasteners and brackets 66, 86 allows for parts of the pantograph support structure 38 to be easily removed and reinstalled, e.g., to allow access for a technician to service or repair the radiator 25 or other components of the vehicle 10 without completely uninstalling the pantograph support structure 38.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A vehicle comprising:
   a chassis;
   a drive system supported by the chassis and including an electrically powered motor configured to propel the vehicle;
   a pantograph configured to engage overhead electrical wires disposed above the vehicle and to transmit electrical current from the overhead electrical wires to the motor; and
   a pantograph support structure mounted to the chassis and configured to support the pantograph, wherein the pantograph support structure includes:
      a first leg frame having a lower end attached to the chassis;
      a second leg frame having a lower end attached to the chassis;
      a lateral frame supported by the first and second leg frames and disposed at upper ends of the first and second leg frames, wherein the lateral frame supports the pantograph;
      a first bearing mount assembly attached to the lower end of the first leg frame and connecting the first leg frame to the chassis, wherein the first bearing mount assembly includes a first bearing assembly; and
      a second bearing mount assembly attached to the lower end of the second leg frame and connecting the second leg frame to the chassis, wherein the second bearing mount assembly includes a second bearing assembly.

2. The vehicle of claim 1, wherein the second leg frame extends vertically upward from a front beam at front end of the vehicle.

3. The vehicle of claim 2, wherein the first leg frame is disposed at a non-perpendicular angle relative to the second leg frame and extends rearward from the upper end of the second leg frame.

4. The vehicle of claim 3, wherein the lateral frame is centered over the second leg frame.

5. The vehicle of claim 1, wherein the first and second bearing assemblies are spherical bearing assemblies and each include an outer ring and an inner ring that is movable relative to the outer ring.

6. The vehicle of claim 5, wherein the outer ring includes an inner diametrical surface having a spherical shape, wherein the inner ring includes an outer diametrical surface having a spherical shape, and wherein the outer diametrical surface of the inner ring is nested within and in movable contact with the inner diametrical surface of the outer ring.

7. The vehicle of claim 1, wherein the pantograph includes links that are movable relative to the pantograph support structure between a stowed position in which the pantograph is spaced apart from the overhead electrical wires and a deployed position in which the pantograph is in contact with the overhead electrical wires, and wherein the pantograph is movable between the stowed and deployed positions without corresponding movement of the pantograph support structure.

8. The vehicle of claim 1, wherein the pantograph support structure includes a brace that is fixedly attached to the first leg frame and the second leg frame.

9. The vehicle of claim 1, wherein the pantograph support structure is attached to the chassis only at the first and second leg frames.

10. The vehicle of claim 1, wherein:
the first leg frame includes a first support beam and a second support beam,
the second leg frame includes a first support beam and a second support beam,
the first support beam of the first leg frame is connected to the chassis by the first bearing mount assembly,
the second support beam of the first leg frame is connected to the chassis by another first bearing mount assembly,
the first support beam of the second leg frame is connected to the chassis by the second bearing mount assembly, and
the second support beam of the second leg frame is connected to the chassis by another second bearing mount assembly.

11. The vehicle of claim 10, wherein the pantograph support structure is attached to the chassis only at the first and second bearing mount assemblies that are attached to the first and second support beams of the first and second leg frames.

12. The vehicle of claim 11, wherein:
the first leg frame includes a plurality of braces that are fixedly attached to and extend between the first and second support beams of the first leg frame,
the second leg frame includes a plurality of braces that are fixedly attached to and extend between the first and second support beams of the second leg frame,
the pantograph support structure includes another brace that is fixedly attached to the first support beam of the first leg frame and the first support beam of the second leg frame, and
the pantograph support structure includes another brace that is fixedly attached to the second support beam of the first leg frame and the second support beam of the second leg frame.

13. The vehicle of claim 1, wherein chassis includes a ladder disposed between second leg frame and a radiator, and wherein the ladder is spaced apart from the pantograph support structure.

14. The vehicle of claim 1, wherein the pantograph is centered over a front bumper of the vehicle.

15. A vehicle comprising:
a chassis;
an electric motor;
a pantograph support structure mounted to the chassis; and
a pantograph mounted on the pantograph support structure and in electrical communication with the electric motor, wherein the pantograph is movable relative to the pantograph support structure between a stowed position in which the pantograph is spaced apart from overhead electrical wires and a deployed position in which the pantograph is in contact with the overhead electrical wires, and wherein the pantograph is movable between the stowed and deployed positions without corresponding movement of the pantograph support structure;
wherein the pantograph support structure includes:
a first leg frame having a lower end attached to the chassis;
a second leg frame having a lower end attached to the chassis;
a first bearing mount assembly attached to the lower end of the first leg frame and connecting the first leg frame to the chassis, wherein the first bearing mount assembly includes a first bearing assembly; and
a second bearing mount assembly attached to the lower end of the second leg frame and connecting the second leg frame to the chassis, wherein the second bearing mount assembly includes a second bearing assembly.

16. The vehicle of claim 15, wherein the second leg frame extends vertically upward from a front beam at front end of the vehicle, and wherein the first leg frame is disposed at a non-perpendicular angle relative to the second leg frame and extends rearward from an upper end of the second leg frame.

17. The vehicle of claim 15, wherein the first and second bearing assemblies each include an outer ring and an inner ring that is movable relative to the outer ring, wherein the outer ring includes an inner diametrical surface having a spherical shape, wherein the inner ring includes an outer diametrical surface having a spherical shape, and wherein the outer diametrical surface of the inner ring is nested within and in movable contact with the inner diametrical surface of the outer ring.

18. The vehicle of claim 15, wherein the pantograph support structure includes a lateral frame attached to upper ends of the first and second leg frames, and wherein the upper ends of the first and second leg frames are fixedly attached to the lateral fame via a rigid bracket.

19. The vehicle of claim 15, wherein:
the first leg frame includes a first support beam and a second support beam,
the second leg frame includes a first support beam and a second support beam,
the first support beam of the first leg frame is connected to the chassis by the first bearing mount assembly,
the second support beam of the first leg frame is connected to the chassis by another first bearing mount assembly,
the first support beam of the second leg frame is connected to the chassis by the second bearing mount assembly,
the second support beam of the second leg frame is connected to the chassis by another second bearing mount assembly, and
the pantograph support structure is attached to the chassis only at the first and second bearing mount assemblies that are attached to the first and second support beams of the first and second leg frames.

20. The vehicle of claim 19, wherein:
the first leg frame includes a plurality of braces that are fixedly attached to and extend between the first and second support beams of the first leg frame,
the second leg frame includes a plurality of braces that are fixedly attached to and extend between the first and second support beams of the second leg frame,
the pantograph support structure includes another brace that is fixedly attached to the first support beam of the first leg frame and the first support beam of the second leg frame, and
the pantograph support structure includes another brace that is fixedly attached to the second support beam of the first leg frame and the second support beam of the second leg frame.

* * * * *